| United States Patent Office | 2,710,083
Patented June 7, 1955 |
|---|---|

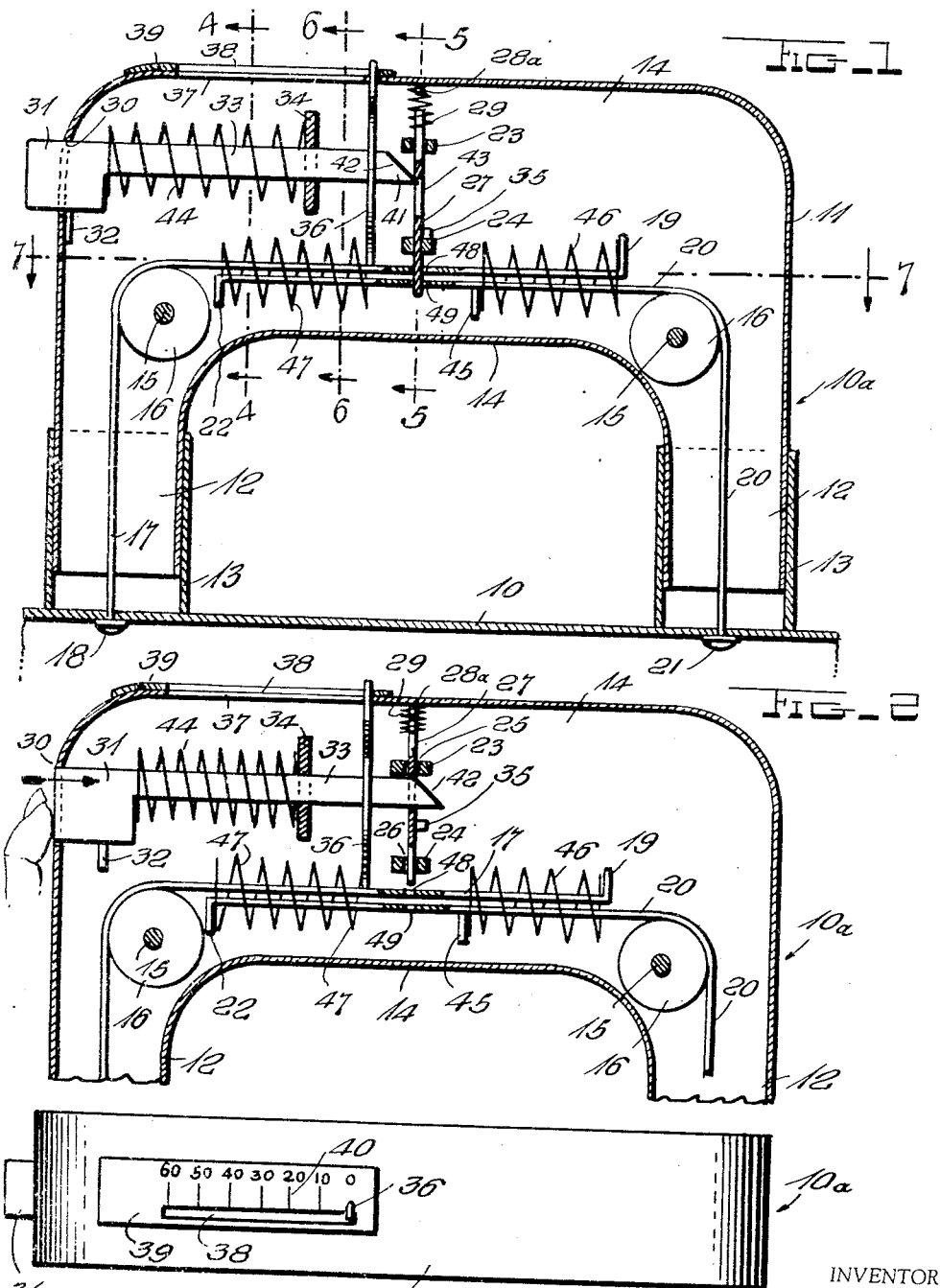

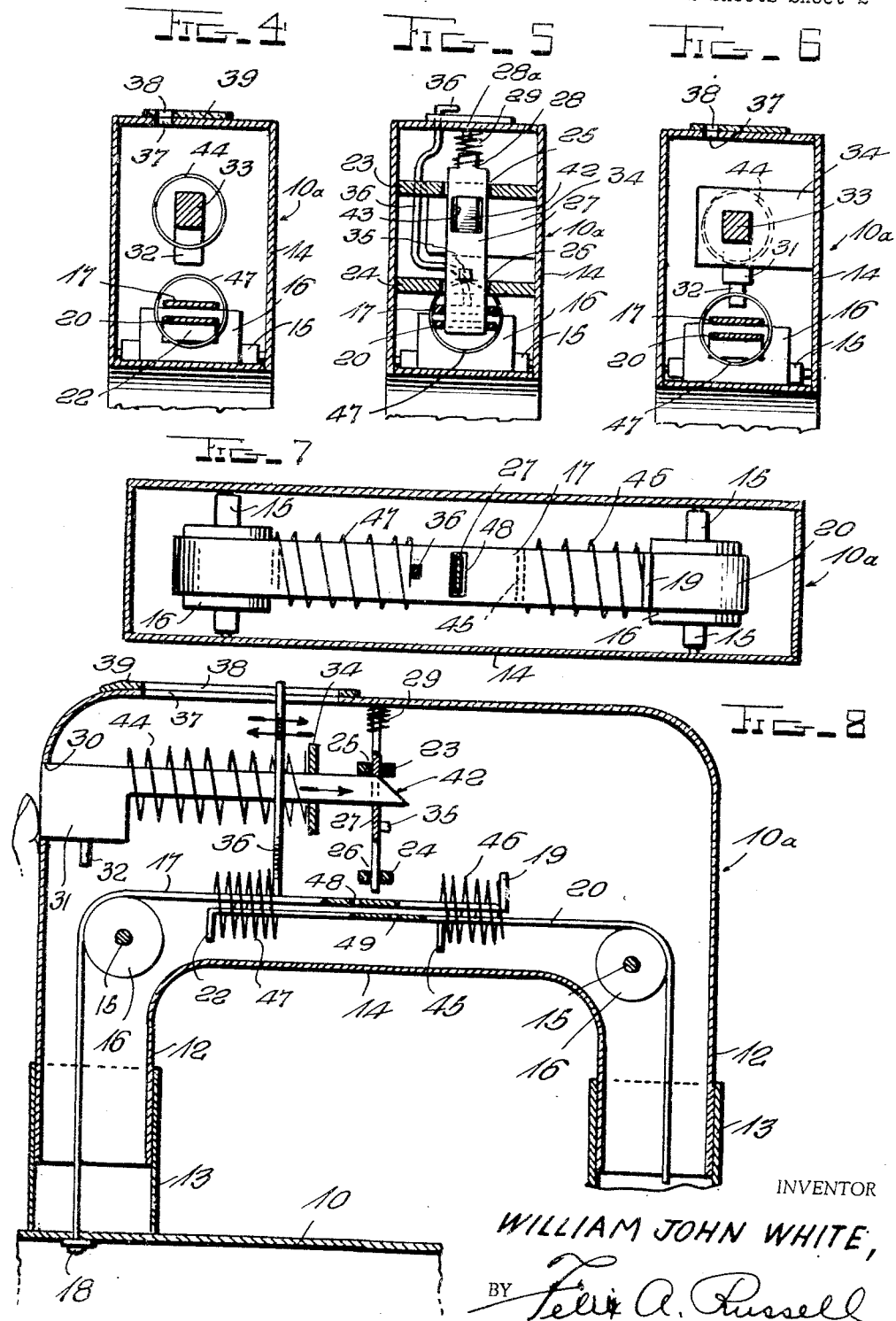

2,710,083

WEIGHING DEVICE FOR LUGGAGE

William John White, Fort Lauderdale, Fla.

Application October 25, 1954, Serial No. 464,288

4 Claims. (Cl. 190—42)

The present invention relates to a weighing device for luggage and it consists in the combinations, constructions and arrangements of parts herein described and claimed.

Generally there is provided a novel handle construction for luggage which handle construction includes therein a weighing mechanism which may be made effective to weigh the bag to which it is attached and the contents contained therein upon the pressing of a button incorporated as a part of the handle structure. The weight is indicated upon a scale mounted in the upper portion of the handle structure whereby the weight may be made immediately apparent to the operator. Release of the button acts to lock the handle in non-weighing condition so that it may be utilized in conventional manner as the handle of the bag to which it is attached.

It is accordingly an object of the invention to provide a novel weighing device for bags and other luggage.

Another object of the invention is to provide a combined luggage handle and weighing scale.

A further object of the invention is to provide, in a device of the character set forth, novel push button operating means forming a part of the invention.

Other and further objects of the invention will become apparent from a reading of the following specification taken in conjunction with the drawings, in which:

Figure 1 is a vertical longitudial sectional view of an embodiment of the invention illustrating the same in locked condition.

Figure 2 is a view similar to Figure 1 but showing the device in unlocked condition and at rest, Figure 3 is a plan view of Figure 1, Figure 4 is a sectional view taken along line 4—4 of Figure 1, Figure 5 is a sectional view taken along line 5—5 of Figure 1, Figure 6 is a sectional view taken along lone 6—6 of Figure 1, Figure 7 is a sectional view taken along line 7—7 of Figure 1, and Figure 8 is a view similar to Figure 2 but showing the device in use as a weighing scale.

Referring more particularly to the drawings, there is shown therein a luggage bag 10 to the upper end of which is affixed a handle structure generally indicated at 10a and which consists of a hollow inverted U-shaped handle 11 the legs 12 of which are slidably mounted in a pair of sockets 13 which are affixed in any suitable manner to the upper side of the bag 10.

The handle 10 is provided with a hollow bight portion 14 in either end portion of which there is journaled a transversely extending shaft 15 upon which is affixed a roller 16. A flat spring 17 is affixed at one of its ends, as indicated at 18, to the bag 10 and extends upwardly and over one of the rollers 16 and thence horizontally toward the other roller 16 and terminates in an upwardly extending dog 19. A like flat spring 20 is affixed at one of its ends, as indicated at 21, to the bag 10 and extends thence upwardly and over the other roller 16 and thence toward the first roller 16 terminating in a downwardly extending dog 22, it being apparent that the horizontal portion of the spring 20 underlies the horizontal portion of the spring 17.

Centrally mounted in the bight portion 14 of the handle 10a is a pair of vertically spaced transversely extending guide bars 23 and 24 each of which is provided with a vertical slot 25 and 26, respectively.

Slidably mounted in the slots 25 and 26 of the bars 23 and 24 is a vertically extending latch plate 27 having a reduced upper end 28, as shown in Figure 5. Centrally dependent from the upper side of the bight portion 14 is a dog 28a. A compression spring 29 surrounds the dog 28a at one end and the reduced portion 28 of the plate 27 at the other end thereof and is adapted to urge the plate 27 in a downward direction.

An opening 30 is provided in one end of the bight portion 14 an has slidably mounted therein a push button 31 having a dependent dog 32 affixed to the underside thereof and having an inwardly and horizontally extending shaft 33 formed integrally with the inner face thereof, the shaft 33 extending slidably through a guide arm 34 which is affixed to the inner face of one side of the bight portion 14 and extends in a transverse direction therein.

A stop member 35 is affixed to one side of the plate 27 between the guide bars 23 and 24 whereby to limit the downward movement of the plate 27. A pointer 36 is affixed to the upper side of the horizontal portion of the spring 17 and extends upwardly through a longitudinal slot 37 in the upper face of the bight portion 14 and through a registering slot 38 formed in a plate 39 affixed atop the bight portion 14. The plate 39 is provided with a scale 40 which is adapted to indicate in cooperation with the pointer 36 the weight of the bag 10 and its contents.

The inner end of the shaft 33 is pointed, as indicated at 41, which pointed end is provided with an outwardly and upwardly inclined upper surface 42 and the device is so arranged that a portion of the pointed end 41 is at all times within an opening 43 formed in the plate 27, such opening being clearly shown in Figure 1, for example.

A compression spring 44 surrounds the shaft 33 and bears at one of its ends against the arm 34 and at its other end against the inner face of the button 31.

The spring 20 is provided with a dependent dog 45 approximately midway in its horizontal portion and a compression spring 46 surrounds both springs 17 and 20 and bears at one of its ends at the dog 45 and against its other end against the dog 19. A like compression spring 47 surrounds both springs 17 and 20 and bears at one of its ends against the dog 22 and at its other end against the pointer 36.

The springs 17 and 20 are each provided with a transverse slot 48 and 49, respectively, which are normally in vertical registry as indicated, for example, in Figure 2 of the drawings.

In operation, it will be apparent that the normal condition of the device is as shown in Figure 1 wherein the latch plate 27 has been extended to its lowermost position through the slots 48 and 49 whereby to lock the springs 17 and 20 against any movement. In this condition, it will be apparent that the handle 10a may be used in the normal manner to carry the bag 10. When, however, it is desired to weigh the bag and the contents thereof, it is only necessary to press the push button 31 inwardly as indicated in Figure 2. This action will cause the angularly disposed upper face 42 of the pointed end 41 of the shaft 33 to impinge upon the upper side of the opening 43 to thereby lift the plate 27 against the action of the spring 29 out of engagement in the slots 48 and 49 thus freeing the springs 17 and 20 for action. In order to find the weight of the bag 10 and its contents, it is then only necessary to raise the handle 10a to such an extent that the bag 10 and the contents thereof are now supported by the springs 17 and 20. It will be apparent that the legs 12 will move upwardly for a distance out of the sockets 13 and such upward movement will be limited by the springs 46 and 47 which will be compressed due to the weight of the bag 10 and its contents. It will be likewise apparent that the springs 17 and 20 will move away from each other during this operation and that therefore the pointer 36 will move to the left as viewed in any of the Figures 1, 2 and 8. The weight of the bag and contents may then be ascertained by reading the scale 40 with the indicating end of the pointer 36.

To again allow the handle 10a to assume its normal condition, it is only necessary to release the pressure upon the push button 31 whereupon the spring 44 will move the same to its original position, such outward movement of the button 31 being limited by the dog 32 impinging upon the inner face of the handle 10a. Likewise during this outward movement of the button 31, the shaft will move outwardly of the opening 43 thus allowing the spring 29 to again force the plate 27 downwardly through the openings 48 and 49 which will again be in registry when no weight is now being placed upon the springs 17 and 20.

While but one form of the invention has been shown and described herein, it will be readily apparent to those skilled in the art that many minor modifications may be made without departing from the spirit of the invention or the scope of the appended claims.

What is claimed is:

1. A device of the character described comprising, in combination with a luggage bag having a top, the provision of a pair of upwardly extending sockets affixed to said top, an inverted U-shaped handle having each of its legs telescopically mounted in a socket, a roller transversely mounted in each end portion of the bight portion of said handle, a flat flexible band affixed to said top within each of said sockets and each entrained over a roller, said bands each having its free end portion extending horizontally in overlapped position in said handle, said handle having a longitudinal slot in the upper face of its bight portion, a vertically extending pointer affixed to the uppermost horizontal portion of said bands and extending through said slot, a scale plate mounted on said handle and readable with said pointer, and springs carried by said horizontal portions and adapted to resist outward movement of said horizontal portions.

2. A device as defined in claim 1 having means for latching said bands against relative movement.

3. A device as defined in claim 1 having means for latching said bands against relative movement, said means comprising a vertically slidable latch plate mounted in the bight portion of said handle, said horizontal portions each having a transverse slot, said slots being in normal vertical registry, a compression spring normally urging said plate through said slots, and push button-operated means carried by said handle for moving said plate from engagement with said bands.

4. A device as defined in claim 3 wherein said last-named means includes a transverse guide bar in said handle, a horizontal shaft extending slidably through said guide bar, a push button slidably extending through one end of said handle and affixed to the outer end of said shaft, a compression spring surrounding said shaft and bearing against said guide bar and said button, said plate having a rectangular opening therein, and said shaft having a pointed inner end provided with an upwardly and outwardly inclined upper face engageable with the upper side of said plate opening.

References Cited in the file of this patent

UNITED STATES PATENTS

| | | |
|---|---|---|
| 812,830 | Dahlman | Feb. 20, 1906 |
| 1,140,592 | Henderson | May 25, 1915 |
| 2,518,973 | Atherton | Aug. 15, 1950 |

FOREIGN PATENTS

| | | |
|---|---|---|
| 4,889 | Great Britain | 1879 |
| 71,931 | Austria | July 10, 1916 |
| 338,631 | Germany | June 28, 1921 |
| 371,818 | Germany | Mar. 22, 1923 |